Figure 1:
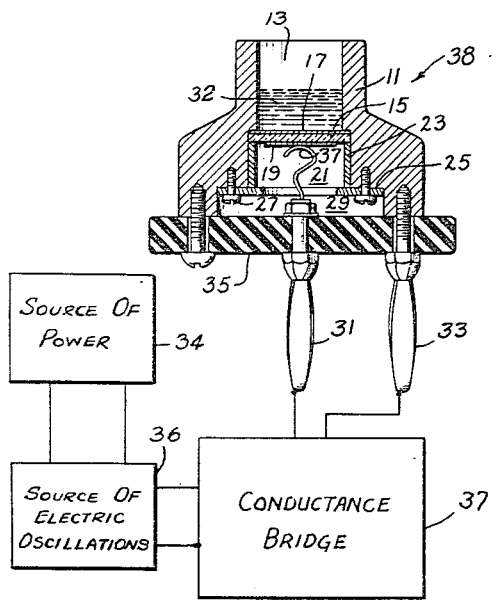

June 28, 1955  J. S. MENDOUSSE  2,711,646
ACOUSTIC IMPEDANCE MEASURING DEVICE FOR LIQUIDS
Filed April 25, 1950

INVENTOR.
JEAN S. MENDOUSSE
BY
ATTORNEYS

United States Patent Office 2,711,646
Patented June 28, 1955

2,711,646
ACOUSTIC IMPEDANCE MEASURING DEVICE FOR LIQUIDS

Jean S. Mendousse, Washington, D. C., assignor to the United States of America as represented by the Secretary of the Navy Application April 25, 1950, Serial No. 158,045

2 Claims. (Cl. 73—53)

The present invention relates to electrical measurement devices, and more particularly, to apparatus for and a method of measuring the transmission characteristics of material media commonly used in propagation of compressional wave energy.

Presently known methods of determining the properties of such propagation media, and particularly for determining the characteristic acoustic impedance thereof, generally involve a computation of the impedance from observed values of the velocity of a compressional wave in the medium and the density of the medium. At a given frequency of operation, the wave velocity can be measured directly by means of pulsed waves, and if the frequency value is not excessively high, the velocity can also be measured indirectly by means of an acoustic interferometer.

Pulse methods, as presently employed, require the use of excessively large quantities of the medium, particularly where the medium is liquid. Standing-wave or interferometric methods are convenient only at low frequencies of operation, and these methods are not only extremely laborious, but require elaborate apparatus also requiring very large quantities of the medium. In accordance with the teaching of the present invention, the disadvantages of both these prior-known methods are overcome by the provision of apparatus and method that are relatively simple to perform and that require only a very small quantity of the medium to accomplish the desired determination.

Therefore, it is a principal object of the present invention generally to provide new and improved methods and apparatus for determining the transmission characteristics of material media.

Another object is to provide novel methods and apparatus for determining the characteristic acoustic impedance of materials, particularly liquids.

Another object is to provide novel methods and apparatus for determining the characteristic acoustic impedance of liquids wherein only a relatively small quantity of liquid is required.

The methods and apparatus of the present invention flow directly from the discovery of a hitherto unknown characteristic of electromechanical transducers radiating into a propagation medium that resides in the fact that, when the area of the radiating surface of the transducer and the distance traversed by the waves in the medium are both sufficiently large as compared to the wave length of the wave at the operating frequency, the measured electric conductance of the transducer is substantially independent of the volume of the liquid medium. If the radiating area is small, say of the order of one square centimeter, and if the frequency operation is relatively high, as for example several megacycles per second, the wave length of the radiation in the medium is so short that, even with a volume of liquid equal to a fraction of a cubic centimeter, the distance traversed by the waves in the liquid is still large as compared with the wave length of the wave, and the independence of conductance and volume of medium obtains.

The specific acoustic impedance is readily calculated from the measured electric conductance and the constants of the transducer, as will be described in detail hereinbelow.

It is, therefore, a further object of the invention to provide an apparatus for determining the transmission characteristics of a medium in which a transducer is employed having a predetermined effective radiating area, the transducer being supported in a quantity of transmission material having dimensions of the same order of magnitude as the dimensions of the effective radiating area.

Figure 2:
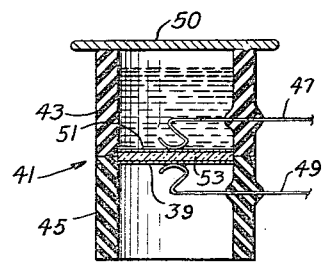
Figure 3:
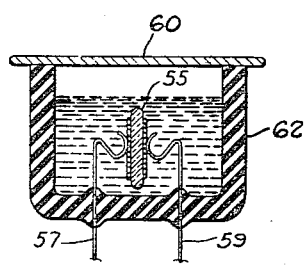
Figure 4:
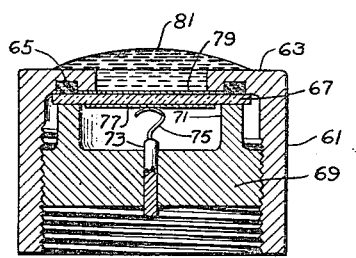

Other objects and many of the attendant advantages of this invention will be readily appreciated as the same becomes better understood by reference to the following detailed description when considered in connection with the accompanying drawing wherein:

Fig. 1 is a diagrammatic representation of the method and apparatus for determining the transmission characteristics of a medium, illustrating a preferred transducer assembly in longitudinal cross section and showing associated elements diagrammatically, and Figs. 2, 3 and 4 are longitudinal cross-sectional views of modifications of the transducer assembly.

A crystal transducer assembly for radiating compressional wave energy in a liquid medium is illustrated in Fig. 1, and comprises a substantially cylindrical container 11 that can be of any suitable conductive material, and has a smooth bore 13 open at one end and adapted to be closed at a point intermediate the ends thereof by a slab of piezoelectric material such as crystal 15. The bore part extending from crystal 15 to the open end normally contains a fluid medium 32 of which the transmission characteristics are to be determined.

The crystal 15 can be of quartz or other suitable material, and X-cut for oscillation in the direction of its axis and parallel to the longitudinal axis of the container 11.

Conductive films or plates 17 and 19 are formed as by sputtering or other suitable method, on the upper and lower surfaces of crystal 15, whereby a variable electric potential from any convenient source is applied across the crystal to set up oscillation thereof. As shown, the film or plate 19 is desirably of smaller diameter than the crystal 15, and is centered thereon so that an unplated annular crystal surface is exposed, thereby to minimize the danger of arcing or breakdown across the edge of crystal 15.

The crystal 15 is positioned within the bore 13 by pressing it against a shoulder formed at the junction of the bore 13 and an intermediate-diameter-bore portion 21. For this purpose, a thin, snugly-fitting sleeve 23 is provided, the sleeve being itself secured by a spring washer 25 fastened, as by screws 27, against a second shoulder formed at the junction of the intermediate-bore portion 21 and an enlarged-bore portion 29.

To provide a fluid-tight seal between the upper crystal surface and the upper shoulder, any suitable conductive bonding material can be applied therebetween.

It is desirable to avoid a perfectly horizontal or level mounting of the crystal 15, for, as will be shown below, a condition of exact parallelism between the crystal surface and the free surface of fluid thereabove is accompanied by undesirable reflection of waves from the free fluid surface to the radiating crystal surface. Therefore, in mounting the crystal, care should be exercised to avoid perfectly horizontal positioning of the crystal.

Connection of the crystal plates 17 and 19 to the apparatus for measuring the conductance is effected by means of plug-in terminals 31, 33, which extend through openings in an insulating base 35. The terminal 31 carries spring contact 37 that makes electrical connection with the lower plate 19, while terminal 33 is threadedly received in the wall of container 11 for direct electrical contact with the upper plate 17.

For measuring the conductance of the crystal 15, any conventional conductance-bridge apparatus 37 may be employed. An arrangement that has performed satisfactorily is the so-called Twin-T Network, Type 821-A, manufactured by the General Radio Company, Cambridge, Massachusetts. The structure and operational features of this apparatus are described in that company's Catalog L, pages 72 and 73 (1948), and inasmuch as the specific bridge arrangement, per se, forms no part of this invention, detailed description of that arrangement is unnecessary. (Broadly, a source of power 34 feeds an electric impedance-measuring device such as conductance bridge 37 through a source of electric oscillations 36, and the output of bridge 37 is fed to an acoustic impedance-measuring device 38, as shown in Fig. 1.)

The method of determining the characteristic acoustic impedance of the medium is accomplished by pouring into the bore part 13 a quantity of fluid 32 to be tested. Only enough fluid to cover the crystal 15 is required. The assembly is plugged into the bridge circuit 37 and the conductance of the crystal is determined in conventional manner. From the measured conductance value and the constants of the crystal, the characteristic impedance is readily computed, using the formula $$g = \frac{4E^2 A}{\rho_0 C_0 t^2}$$

where $g$ is the conductance, $E$ is the piezoelectric stress constant, $A$ is the area of the radiating surface, $t$ is the thickness of the crystal, and $\rho_0 C_0$ is the characteristic acoustic impedance. The constants $E$, $A$ and $t$ are, of course, measurable independently of the present method and apparatus.

It may be supposed that the method and apparatus of this invention is subject to an inaccuracy resulting from the fact that so small a quantity of fluid medium is employed, and that with so short an acoustic path in the liquid, the reaction of the acoustic load on the transducer should be affected by waves reflected back to the crystal 15 from the free surface of the liquid. This effect, it has been observed, occurs only when the free surface is exactly parallel to the surface of the crystal. However, where such exact parallelism is avoided this deleterious effect is obviated by the fact that the waves are reflected in random directions and, accordingly, mutually cancelled. The conductance thus measured is the same as though the transducer were radiating into an infinite quantity of liquid.

Figs. 2, 3 and 4 illustrate modifications of the crystal assembly, according to this invention. Fig. 2 shows a simplified form of the assembly above-described in connection with the apparatus of Fig. 1. Thus a crystal 39 is suitably mounted in an insulated tubular holder 41, which holder can conveniently be made in two sections 43, 45, the upper section to serve as a container for the fluid to be measured. The crystal 39 forms the bottom of the fluid-containing cell, and connection to the external measurement circuit and source is effected through spring-contact terminal wires 47 and 49 that contact plates 51 and 53, respectively.

The lower section 45 effectively protects the crystal 39 against shock, and also provides a mounting for the spring terminal 49. Lid 50 caps the upper section of holder 41 to prevent evaporation in case a volatile liquid such as ether is being tested.

In Fig. 3, a crystal 55 is completely submerged in the fluid medium and is therein supported by spring-contact terminal wires 57, 59. Lid 60 caps the insulated holder 62.

Fig. 4 shows a cartridge type of crystal holder in which an internally threaded body member 61 is open at one end and has an inwardly extending flange 63 at the other. The flange 63 is provided with an annular groove in which a rubber gasket 65 is disposed and against which a crystal 67 is pressed by screw 69.

The forward end of screw 69 is formed as a hollow cylinder 71 of reduced diameter relative the body 61. A spring-contact terminal 73 fixedly mounted in the screw 69 has a resilient contacting part 75 thereof projecting into the cylinder 71 for contacting engagement with the lower conductive plate 77 of crystal 67. It will be noted that plate 77 is of reduced diameter with respect to the diameter of the cylinder 71. The upper conductive plate 79 of crystal 67 is desirably of a diameter at least as great as the inner diameter of the gasket 65.

With the cartridge mounting hereinabove described, connection to the appropriate coaxial terminals of a conventional conductance bridge apparatus is readily obtained. The walls of body member 61 serve as the outer conductor of the coaxial line and the terminal 73 forms the inner conductor of the line. When the cartridge is positioned so that the radiating surface of the crystal is horizontal a few drops of liquid to be tested 81, enough to cover the surface, are sufficient to give the crystal the same conductance it would have if radiating into an unlimited amount of fluid. In this case, it is the convexity of the meniscus at the surface of the liquid that prevents parallelism between this surface and the face of the crystal.

For the purpose of the present discussion I have referred to the necessary measurements as measurements of conductance. It will be evident to those familiar with the art that measurements of resistance could equally well be made, or indeed of any electric characteristic of the transducer that varies with the acoustic load.

Obviously many modifications and variations of the present invention are possible in the light of the above teachings. It is therefore to be understood that within the scope of the appended claims the invention may be practiced otherwise than as specifically described.

I claim:

1. The method of determining the characteristic acoustic impedance of a liquid medium comprising covering a crystal transducer with a thin layer of the liquid, electrically energizing the crystal to transmit vibrations into the liquid, the frequency of the crystal energizing current being so high that the effect of reflected waves on the conductance of the transducer is negligible, and determining the conductance of said transducer as so loaded.

2. A crystal holder comprising an electrically conductive shell having a bore characterized by parts of relatively small, large and intermediate diameter, the junctions of said small and intermediate parts and said intermediate and large parts defining respective shoulders, an electro-mechanical oscillator mounted on one said shoulder, one side of said oscillator being physically and electrically continuous therewith, said oscillator and said relatively small part defining a reservoir for a fluid sample to be tested, a source of variable electric potential, a sleeve for retaining said oscillator mounted on the other said shoulder, a spring-contact terminal in electrical contact with the other side of said oscillator and means including said shell connecting said oscillator to said source of variable electric potential.

References Cited in the file of this patent

UNITED STATES PATENTS

| | | |
|---|---|---|
| 2,031,951 | Hartley | Feb. 25, 1936 |
| 2,394,461 | Mason | Feb. 5, 1946 |
| 2,427,348 | Bond et al. | Sept. 16, 1947 |
| 2,479,264 | Rosenberg | Aug. 16, 1949 |
| 2,592,134 | Firestone | Apr. 8, 1952 |
| 2,607,216 | Mason | Aug. 19, 1952 |
| 2,626,992 | Holman | Jan. 27, 1953 |

OTHER REFERENCES

Great Britain, "Journal of Scientific Instruments and of Physics in Industry," vol. 24, October 1947, pp. 276–277.